(12) United States Patent
Kojima et al.

(10) Patent No.: US 12,221,591 B2
(45) Date of Patent: Feb. 11, 2025

(54) REFRIGERATION CYCLE APPARATUS

(71) Applicant: Mitsubishi Electric Corporation, Tokyo (JP)

(72) Inventors: Kenji Kojima, Tokyo (JP); Kengo Hiratsuka, Tokyo (JP); Satoru Toyama, Tokyo (JP); Manami Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 261 days.

(21) Appl. No.: 18/008,668

(22) PCT Filed: Jul. 21, 2020

(86) PCT No.: PCT/JP2020/028233
§ 371 (c)(1),
(2) Date: Dec. 7, 2022

(87) PCT Pub. No.: WO2022/018821
PCT Pub. Date: Jan. 27, 2022

(65) Prior Publication Data
US 2023/0242833 A1 Aug. 3, 2023

(51) Int. Cl.
C10M 129/20 (2006.01)
C09K 5/04 (2006.01)
(Continued)

(52) U.S. Cl.
CPC ......... C10M 169/044 (2013.01); C09K 5/044 (2013.01); C10M 129/20 (2013.01);
(Continued)

(58) Field of Classification Search
None
See application file for complete search history.

(56) References Cited

U.S. PATENT DOCUMENTS 10,301,521 B2  5/2019 Sethi et al.
2015/0038381 A1  2/2015 Matsumoto et al.
(Continued)

FOREIGN PATENT DOCUMENTS

JP  2008-505989 A  2/2008
JP  5972640 B2  8/2016
(Continued)

OTHER PUBLICATIONS

Indian Office Action issued Apr. 6, 2023, in corresponding Indian Patent Application No. 202227070430, 5pp.
(Continued)

Primary Examiner — Tam M Nguyen
(74) Attorney, Agent, or Firm — XSENSUS LLP

(57) ABSTRACT

A refrigeration cycle apparatus including a refrigeration circuit, the refrigeration circuit including a compressor, an outdoor heat exchanger, an indoor heat exchanger, and an expansion valve, wherein a refrigerant is sealed within the refrigeration circuit, the refrigerant contains trifluoroiodomethane, the compressor is filled with a refrigerator oil, and the refrigerator oil contains at least one of a first compound represented by the following chemical formula 1 and a second compound represented by the following chemical formula 2:

[Chemical Formula 1]

(Continued)

-continued

[Chemical Formula 2]

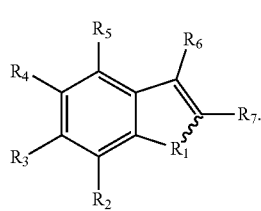

9 Claims, 1 Drawing Sheet

(51) Int. Cl.
*C10M 129/70* (2006.01)
*C10M 145/26* (2006.01)
*C10M 161/00* (2006.01)
*C10M 169/04* (2006.01)
C10N 30/04 (2006.01)
C10N 40/30 (2006.01)

(52) U.S. Cl.
CPC ........ *C10M 129/70* (2013.01); *C10M 145/26* (2013.01); *C10M 161/00* (2013.01); C09K 2205/122 (2013.01); C09K 2205/24 (2013.01); C10M 2207/044 (2013.01); *C10M 2207/2835* (2013.01); *C10M 2207/284* (2013.01); *C10M 2209/103* (2013.01); C10N 2030/04 (2013.01); C10N 2040/30 (2013.01)

(56) References Cited

U.S. PATENT DOCUMENTS

| | | | |
|---|---|---|---|
| 2018/0030325 | A1 | 2/2018 | Petersen et al. |
| 2019/0233698 | A1 | 8/2019 | Yana Motta et al. |
| 2022/0349633 | A1* | 11/2022 | Hiratsuka .............. C09K 5/044 |

FOREIGN PATENT DOCUMENTS

| | | |
|---|---|---|
| JP | 2019-527286 A | 9/2019 |
| WO | 2005/103191 A2 | 11/2005 |
| WO | 2008-208039 A | 9/2008 |
| WO | 2018/022949 A2 | 2/2018 |
| WO | 2018/204860 A1 | 11/2018 |
| WO | 2019/109000 A1 | 6/2019 |

OTHER PUBLICATIONS

International Search Report and Written Opinion mailed on Sep. 15, 2020, received for PCT Application No. PCT/JP2020/028233, filed on Jul. 21, 2020, 10 pages including English Translation.

* cited by examiner

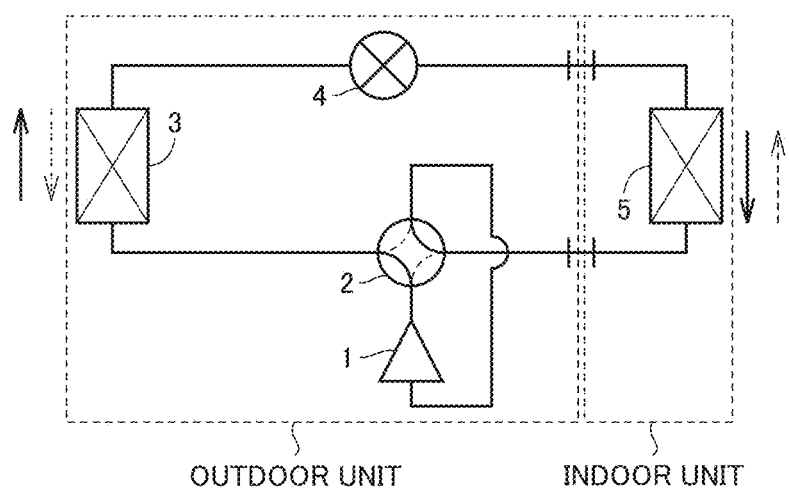

REFRIGERATION CYCLE APPARATUS

CROSS-REFERENCE TO RELATED APPLICATION

The present application is based on PCT filing PCT/JP2020/028233, filed Jul. 21, 2020, the entire contents of which are incorporated herein by reference.

TECHNICAL FIELD

The present disclosure relates to a refrigeration cycle apparatus.

BACKGROUND ART

Currently, usage of refrigerant in refrigeration cycle apparatuses is restricted by the Law Concerning the Discharge and Control of Fluorocarbons (enforced in April, 2015), more specifically by global warming potential (GWP).

Because of this, refrigerants that are compliant with the GWP requirements have been in use. As such a refrigerant, a refrigerant mixture containing a halogenated hydrocarbon having a C—I bond such as trifluoroiodomethane which is low in GWP and non-flammable is disclosed by PTL 1 (Japanese National Patent Publication No. 2008-505989).

However, trifluoroiodomethane is an unstable compound that is easily decomposed, so, how to deal with this unstable nature has been a problem to solve in order to maintain long-term reliability of refrigeration cycle apparatuses and compressors.

To address this problem, PTL 2 (Japanese National Patent Publication No. 2019-527286) discloses adding a diene-based compound, a phenol-based compound, a phosphorus compound, and a nitrogen compound as a stabilizer to a compressor lubricant oil to inhibit an increase of the concentration of acid generated due to decomposition of a trifluoroiodomethane-containing refrigerant and to scavenge radicals generated due to decomposition of a trifluoroiodomethane-containing refrigerant, for inhibiting further decomposition of trifluoroiodomethane, deterioration of refrigerator oil, and corrosion of metal.

However, the trifluoroiodomethane decomposition inhibiting effect of the compound described in PTL 2 is insufficient to maintain long-term reliability of refrigeration cycle apparatuses and compressors. A compound described by PTL 3 (the specification of U.S. Patent Laying-Open No. 2019/0233698) has a higher trifluoroiodomethane decomposition inhibiting effect than that of PTL 2, but the former has another problem of not having a vapor-phase trifluoroiodomethane decomposition inhibiting effect.

CITATION LIST

Patent Literature

PTL 1: Japanese National Patent Publication No. 2008-505989
PTL 2: Japanese National Patent Publication No. 2019-527286
PTL 3: U.S. Patent Laying-Open No. 2019/0233698 specification

SUMMARY OF INVENTION

Technical Problem

The present disclosure has been devised in light of the above problems, and an object of the present disclosure is to provide a refrigeration cycle apparatus that uses a trifluoroiodomethane-containing refrigerant and maintains long-term reliability.

Solution to Problem

A refrigeration cycle apparatus according to the present disclosure includes a refrigeration circuit that includes a compressor, an outdoor heat exchanger, an indoor heat exchanger, and an expansion valve. A refrigerant is sealed within the refrigeration circuit, and the refrigerant includes trifluoroiodomethane. The compressor is filled with a refrigerator oil, and the refrigerator oil contains at least one of a first compound represented by the following chemical formula 1 and a second compound represented by the following chemical formula 2.

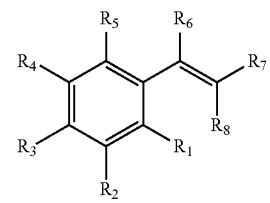

[Chemical Formula 1]

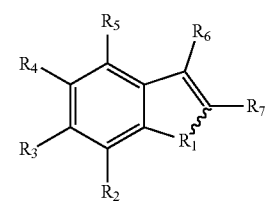

[Chemical Formula 2]

In the above chemical formula 1, each of $R_1$ to $R_5$ is a substituent composed of at least one of carbon atom, hydrogen atom, and oxygen atom, and at least one of $R_6$ to $R_8$ is a hydrogen atom with the remainder being a substituent composed of at least one of carbon atom, hydrogen atom, and oxygen atom. In the above chemical formula 2, $R_1$ is a substituent forming a ring structure with neighboring carbon atoms, each of $R_2$ to $R_5$ is a substituent composed of at least one of carbon atom, hydrogen atom, and oxygen atom, and at least one of $R_6$ to $R_7$ is a hydrogen atom with the remainder being a substituent composed of at least one of carbon atom, hydrogen atom, and oxygen atom.

Advantageous Effects of Invention

The present disclosure makes it possible to provide a refrigeration cycle apparatus that uses a trifluoroiodomethane-containing refrigerant and maintains long-term reliability.

BRIEF DESCRIPTION OF DRAWINGS

FIG. 1 is a schematic diagram of the configuration of a refrigeration cycle apparatus according to Embodiment 1.

DESCRIPTION OF EMBODIMENTS

Hereinafter, embodiments of the present disclosure will be described with reference to the drawing.

Embodiment 1

Firstly, an overview of a refrigeration cycle apparatus according to the present embodiment will be described briefly. FIG. 1 is a schematic diagram of the configuration of the refrigeration cycle apparatus according to Embodiment 1. The refrigeration cycle apparatus includes a refrigeration circuit that includes a compressor 1, a flow path switching valve 2 for switching the flow direction between cooling operation and heating operation, an outdoor heat exchanger 3, an expansion valve 4, and an indoor heat exchanger 5. For a refrigeration cycle apparatus that is not required to switch between cooling and heating, flow path switching valve 2 is not necessary.

For cooling, gaseous refrigerant of high temperature and high pressure generated by compression by compressor 1 flows via flow path switching valve 2 (the flow path indicated by the solid line) into outdoor heat exchanger 3, where it is condensed. The liquid refrigerant thus condensed in outdoor heat exchanger 3 flows via expansion valve 4 into indoor heat exchanger 5, where it is evaporated (vaporized). Finally, the gaseous refrigerant thus evaporated in indoor heat exchanger 5 returns to compressor 1 via flow path switching valve 2 (the flow path indicated by the solid line). In this way, for cooling, refrigerant circulates in the refrigeration circuit of the refrigeration cycle apparatus in the direction indicated by the solid-line arrows shown in FIG. 1.

In contrast, for heating, gaseous refrigerant of high temperature and high pressure generated by compression by compressor 1 flows via flow path switching valve 2 (the flow path indicated by the dotted line) into indoor heat exchanger 5, where it is condensed. The liquid refrigerant thus condensed in indoor heat exchanger 5 flows via expansion valve 4 into outdoor heat exchanger 3, where it is evaporated (vaporized). The refrigerant thus evaporated in outdoor heat exchanger 3 returns to compressor 1 via flow path switching valve 2 (the flow path indicated by the dotted line). In this way, for heating, refrigerant circulates in the refrigeration circuit of the refrigeration cycle apparatus in the direction indicated by the broken-line arrows shown in FIG. 1.

The above-described elements of the configuration are the fewest possible components required of a refrigeration cycle apparatus capable of cooling and heating operation. The refrigeration cycle apparatus according to the present embodiment may further include other devices such as a gas-liquid separator, a receiver, an accumulator, and a high and low pressure heat exchanger.

(Refrigerant)

Next, a refrigerant to be sealed inside the refrigeration circuit according to the present embodiment is described. The refrigerant contains trifluoroiodomethane.

Moreover, the refrigerant used in the present embodiment may contain trifluoroiodomethane alone, or may further contain an additional component. Examples of the additional component include natural refrigerants including chlorofluorocarbon (CFC), hydrochlorofluorocarbon (HCFC), hydrofluorocarbon (HFC), hydrofluoroolefin (HFO), and hydrocarbon. The content of the additional component, for example, is determined so as not to impair major effects of the present embodiment. When such an additional component is contained in addition to trifluoroiodomethane, the content of trifluoroiodomethane is preferably from 1 to 70 mass % relative to the total amount of the refrigerant.

(Refrigerator Oil)

Next, a refrigerator oil to be filled for lubricating inside the compressor according to the present embodiment is described. Examples of the refrigerator oil include commonly used refrigerator oils (such as ester-based lubricant oils, ether-based lubricant oils, fluorine-based lubricant oils, mineral-based lubricant oils, and hydrocarbon-based lubricant oils), In this case, preferably, a refrigerator oil with excellent compatibility with the refrigerant and excellent stability, among others, is selected. Specific but non-restrictive examples of the refrigerator oil that can be used include polyalkylene glycols, polyol esters, polyvinyl ethers, alkyl benzenes, and mineral oils.

The refrigerator oil contains, as an additive, at least one of a first compound represented by a chemical formula 1 and a second compound represented by a chemical formula 2.

Trifluoroiodomethane decomposition reaction, and reaction in which decomposition-generated radicals are scavenged by the compound, are as represented by the following chemical formula 3.

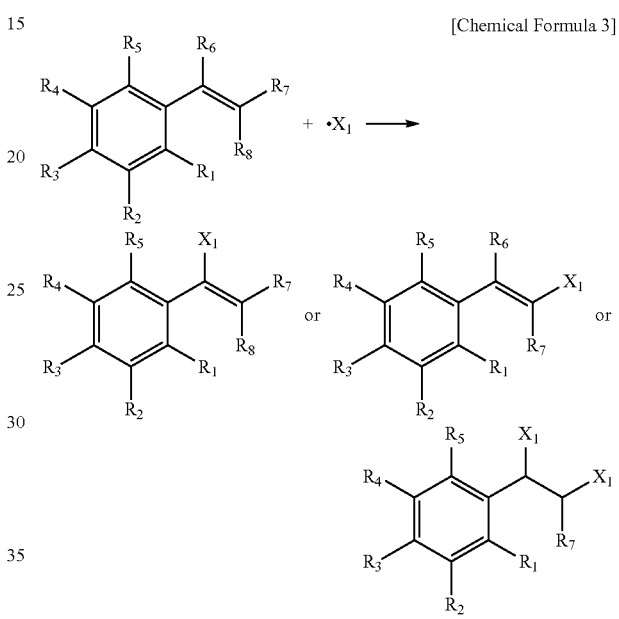

[Chemical Formula 3]

According to the above chemical formula 3, the basic structure of a compound having trifluoroiodomethane decomposition inhibiting effect is either the first compound represented by chemical formula 1 or the second compound represented by chemical formula 2.

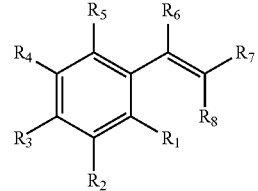

[Chemical Formula 1]

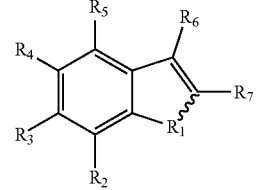

[Chemical Formula 2]

In the first compound represented by chemical formula 1, each of $R_1$ to $R_5$ is a substituent composed of at least one of carbon atom, hydrogen atom, and oxygen atom, preferably at least one of a hydrogen atom, a methoxy group, an ethoxy group, and an alkyl group. $R_1$ to $R_1$ may be the same or different from each other. Moreover, at least one of $R_6$ to $R_8$ substituents is a hydrogen atom. The remainder are each a substituent composed of at least one of carbon atom, hydrogen atom, and oxygen atom, preferably at least one of a hydrogen atom, a methoxy group, an ethoxy group, and an alkyl group. $R_6$ to $R_8$ may be the same or different from each other.

Also, in chemical formula 1, $R_3$ may be —O—$R_9$, $R_9$ may be a hydrocarbon group having 1 to 10 carbon atoms, $R_7$ may be —COO—$R_{10}$, $R_{10}$ may be a hydrocarbon group having 1 to 10 carbon atoms, and each of $R_1$ to $R_2$, $R_4$ to $R_6$, and $R_8$ may be a hydrogen atom or a hydrocarbon group having 1 to 10 carbon atoms. The above ranges of the number of carbon atoms contained by $R_1$ to $R_2$, $R_4$ to $R_6$, and $R_8$ to $R_{10}$ are given by way of illustration, and the scope of the present disclosure is not limited to the above ranges.

Examples of the first compound include ethylhexyl methoxycinnamate, anethole, cinnamyl acetate, and the like, and ethylhexyl methoxycinnamate and anethole are preferable.

The content of the first compound in the refrigerator oil is preferably from 5 mass % to 20 mass %, more preferably from 10 mass % to 15 mass %, further preferably from 12 mass % to 14 mass %, relative to the total amount of the refrigerator oil.

In the second compound represented by chemical formula 2, each of $R_2$ to $R_5$ is a substituent composed of at least one of carbon atom, hydrogen atom, and oxygen atom, preferably at least one of a hydrogen atom, a methoxy group, an ethoxy group, and an alkyl group. $R_2$ to $R_5$ may be the same or different from each other. Moreover, at least one of $R_6$ to $R_7$ substituents is a hydrogen atom. The remainder is a substituent composed of at least one of carbon atom, hydrogen atom, and oxygen atom, preferably at least one of a hydrogen atom, a methoxy group, an ethoxy group, and an alkyl group. $R_6$ to $R_7$ may be the same or different from each other. Further, $R_1$ forms a ring structure with two neighboring carbon atoms of the benzene ring to which $R_1$ is bonded. The ring structure is a 5- to 8-membered carbon ring or heterocyclic ring, preferably a 6-membered heterocyclic ring.

In chemical formula 2, each of $R_2$ to $R_6$ may be a hydrogen atom or a hydrocarbon group having 1 to 10 carbon atoms. The above ranges of the number of carbon atoms contained by $R_2$ to $R_6$ are given by way of illustration, and the scope of the present disclosure is not limited to the above ranges.

Examples of the second compound include coumarin (see the following chemical formula 4), coumarone, and the like, and coumarin is preferable. There is a prior art involving adding fluorescent coumarin or coumarin derivative as a refrigerant leakage detecting agent, but a compound that has a practical level of performance as a fluorescent agent is a coumarin derivative and coumarin itself is not very fluorescent.

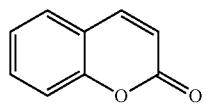

[Chemical Formula 4]

The content of the second compound in the refrigerator oil is preferably from 1 mass % to 10 mass %, more preferably from 2 mass % to 5 mass %, further preferably from 3 mass % to 4 mass %, relative to the total amount of the refrigerator oil.

The first compound and the second compound, each of which has a basic structure enabling radical scavenging reaction shown by chemical formula 3, are highly effective to scavenge radicals resulting from trifluoroiodomethane decomposition, leading to inhibition of decomposition of non-decomposed trifluoroiodomethane, degradation of refrigerator oil, and corrosion of metal. With this high radical scavenging effect, the first compound and the second compound are capable of scavenging trifluoroiodomethane radicals generated in a vapor phase (even when the amount of vaporized matter is very small), that is, they have a vapor-phase trifluoroiodomethane decomposition inhibiting effect.

In the present embodiment, as long as an object of the present disclosure is not impaired, the refrigerator oil may contain at least one additive selected from an extreme pressure agent, an oily agent, an antioxidant, an acid scavenger, a metal inactivator, and a defoaming agent.

(Refrigeration Cycle Apparatus)

In the present embodiment, the refrigeration cycle apparatus is not particularly limited, but may be an air conditioner for commercial use or household use, an automobile air conditioner, a heat pump for vending machines, a cooling cabinet, a refrigerator for cooling the interior of containers and cooling cabinets for maritime transportation or the like, a chiller unit, a turbo refrigerator, or the like.

The refrigeration cycle apparatus according to the present embodiment can also be used for a unit that is dedicated for heating cycle operation, such as floor heating apparatuses and snow melting apparatuses. The refrigeration cycle apparatus according to the present embodiment is especially useful as an air conditioner for commercial use or household use for which downsizing of the apparatus is required.

The description herein regarding the refrigeration cycle apparatus according to the present embodiment is directed to a configuration that has a pair of an outdoor unit and an indoor unit connected to each other, but other configurations having a pair of one outdoor unit and multiple indoor units and configurations having a pair of multiple outdoor units and one indoor unit may also be possible.

The refrigeration cycle apparatus according to the present embodiment may also be a room air conditioner, a packaged air conditioner, or the like capable of switching between cooling and heating, or may also be a refrigeration cycle apparatus for low-temperature apparatuses such as refrigerators.

The refrigeration cycle apparatus according to the present embodiment is preferably a refrigeration cycle apparatus for air conditioning (an air conditioner).

Examples of the refrigeration cycle apparatus for air conditioning (air conditioner) include room air conditioners, packaged air conditioners, multi air conditioners for buildings, window-mounted air conditioners, mobile air conditioners, and the like.

Embodiment 2

A refrigeration cycle apparatus according to this embodiment is different from the one according to Embodiment 1 in that the former contains a dissolution aid in addition to at least one of the first compound and the second compound as an additive for the refrigerator oil.

Addition of the dissolution aid allows for inhibiting the first compound and the second compound from precipitating when the refrigerator oil is cooled.

Non-restrictive examples of the dissolution aid include polyol esters, polyvinyl ethers, alkyl benzenes, polyalkylene glycols, and the like. The dissolution aid is preferably a polyalkylene glycol. The other fundamental structures are the same as those of Embodiment 1, and therefore the description will not be repeated herein.

EXAMPLES

<Evaluation Test 1>

Samples obtained by mixing the refrigerant and the refrigerator oil according to Embodiment 1 (Examples 1 to 7, Comparative Examples 1 to 3) were subjected to an experiment method that was in conformity with JIS K2211:2009 (appendix B, Sealed Tube Test) to assess their chemical stability. Table 1 below gives testing conditions, and Table 2 below gives refrigerator oil mixing compositions and evaluation results.

The evaluation results include the concentration of iodide ions (I−) (trifluoroiodomethane decomposition product) in the refrigerator oil, the acid value and the hue of the refrigerator oil (indicative of the degree of deterioration of the refrigerator oil), and the presence of luster on a metal surface used in the above experiment.

The results were judged as follows: the higher the trifluoroiodomethane decomposition inhibiting effect, the smaller the iodide ion concentration and the acid value.

Moreover, the higher the trifluoroiodomethane decomposition inhibiting effect is, the slower the refrigerator oil deterioration proceeds and thereby the more colorless and transparent the hue is. In contrast, the lower the trifluoroiodomethane decomposition inhibiting effect is, the faster the refrigerator oil deterioration proceeds, causing a change in hue to yellow and then to brown as well as causing a decrease in the degree of transparency.

Similarly, the higher the trifluoroiodomethane decomposition inhibiting effect is, the less the metal surface discolors, leaving the metallic luster preserved. In contrast, the lower the trifluoroiodomethane decomposition inhibiting effect is, the more the metal surface corrodes, causing a loss of metallic luster.

In light of the above, inhibition of trifluoroiodomethane decomposition is judged based on (1) iodide ion (I−) concentration, (2) acid value, (3) hue, and (4) luster on the metal surface. When the values of (1) and (2) are equal or less than the upper limits, or when the degree of transparency of (3) is high, or when metallic luster is observed in (4), trifluoroiodomethane decomposition can be inhibited.

Although any of copper, iron, and aluminum may be used as the metal catalyst, copper is the most susceptible to change, so the results in Table 2 below are given according to judgement on the presence of luster on a copper surface.

"Vapor phase" in Table 2 below refers to when the refrigerant is in the gas state, "Liquid phase" refers to when the refrigerant is in the liquid state; and whether luster was observed on the metal surface was checked when the refrigerant in each state was brought into contact with the metal catalyst.

TABLE 1

| Test vessel | 50 cm$^3$ |
| --- | --- |
| Refrigerant | Trifluoroiodomethane |
| Weight of refrigerant | 7 g |
| Refrigerator oil | Polyol ester (POE) |
| Weight of refrigerator oil | 15 g |
| Metal catalyst | Copper, iron, aluminum |
| Size of metal catalyst | 1 mm (diameter) × 50 mm × 2 |
| Temperature | 140° C. |
| Time | 72 hours |

TABLE 2

| | | | | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
| --- | --- | --- | --- | --- | --- | --- | --- | --- | --- | --- | --- | --- | --- |
| Refrigerator oil mixing composition [mass %] | Base oil | POE oil | VG46 | 90 | 88 | 86 | 98 | 97 | 96 | 85 | 100 | 99 | 96 |
| | Additive | First compound | Ethylhexyl methoxy-cinnamate | 10 | 12 | 14 | | | | 12 | | | |
| | | Second compound | Coumarin | | | | 2 | 3 | 4 | 3 | | | |
| | | Stabilizer | Farnesene | | | | | | | | | 1 | |
| | | | Alkyl naphthalene | | | | | | | | | | 4 |
| Evaluation results | Refrigerator oil | Iodide ion conc. [ppm] | | <1 | <1 | <1 | <1 | <1 | <1 | <1 | 200 | 130 | 10 |
| | | Acid value [mg KOH/g] | | 0.1 | 0.1 | 0.1 | <0.1 | <0.1 | <0.1 | <0.1 | >1.0 | >0.5 | 0.1 |
| | | Hue | | Colorless and transparent | Colorless and transparent | Colorless and transparent | Colorless and transparent | Colorless and transparent | Colorless and transparent | Colorless and transparent | Brown | Yellow and transparent | Colorless and transparent |
| | Metal catalyst | Luster (Liquid phase) | | No | Yes | Yes | No | Yes | Yes | Yes | No | No | Yes |
| | | Luster (Vapor phase) | | No | Yes | Yes | No | Yes | Yes | Yes | No | No | No |

As shown in Table 2 above, referring to the evaluation results regarding refrigerator oil, Examples 1 to 7 had low iodide ion (I−) concentrations, low acid values, and colorless transparent hues, indicating that they had a high trifluoroiodomethane decomposition inhibiting effect.

Referring to the evaluation results regarding metal catalyst, Example 1 and Example 4 had no luster either for the vapor phase or for the liquid phase, while Example 2, Example 3, and Examples 5 to 7 had luster for both the vapor phase and the liquid phase. From these, Examples 2, 3, and 5 to 7 seemed to have a higher trifluoroiodomethane decomposition inhibiting effect than Examples 1 and 4.

Comparative Example 1 had a high iodide ion (I) concentration, a high acid value, a brown hue, and no luster on the metal surface either for the vapor phase or for the liquid phase, indicating that it had a low trifluoroiodomethane decomposition inhibiting effect.

Comparative Example 2 had a high iodide ion (I) concentration, a high acid value, a yellow transparent hue, and no luster on the metal surface either for the vapor phase or for the liquid phase, indicating that it had a low trifluoroiodomethane decomposition inhibiting effect.

Comparative Example 3 had a high iodide ion (I) concentration. Although the other evaluation results were good, it seems to have a low trifluoroiodomethane decomposition inhibiting effect.

<Evaluation Test 2>

Samples obtained by mixing the refrigerant and the refrigerator oil (Examples 8 to 11) were subjected to an evaluation that involved checking the presence of precipitation of the additive, namely the first compound and the second compound; as shown in Table 3 below, the temperature was lowered from −20° C. at 5° C. intervals, with each temperature being maintained for 1 hour, and when precipitation of the additive occurred within the retention time, the temperature was recorded as "Additive precipitation temperature".

As one of the evaluation results, the temperature at which precipitation occurred during cooling of a mixture of refrigerator oil (the mixing composition is shown in Table 4 below) and refrigerant is defined as "Additive precipitation temperature". The better the solubility of the compound in the refrigerator oil, the lower the precipitation temperature. Although it depends on the type of the apparatus used, in the case of a refrigeration cycle apparatus, for example, the temperature inside the refrigeration circuit can decrease to below −10° C. Because of this, the temperature at which additive precipitation occurs in refrigerator oil is preferably as low as possible.

TABLE 3

| | |
|---|---|
| Test vessel | 96 cm³ |
| Refrigerant | Trifluoroiodomethane |
| Weight of refrigerant | 5 g |
| Refrigerator oil | Polyol ester (POE) |
| Weight of refrigerator oil | 45 g |
| Temperature | Lowered from −20° C. at 5° C. intervals |
| Retention time | 1 Hour at each temperature |
| Judgement | Temperature at which additive precipitation occurred within the retention time is defined as "Additive precipitation temperature". |

TABLE 4

| | | | | Ex. 8 | Ex. 9 | Ex. 10 | Ex. 11 |
|---|---|---|---|---|---|---|---|
| Refrigerator oil mixing composition [mass %] | Base oil | POE oil | VG46 | 80 | 74 | 96 | 90 |
| | Additive | First compound | Ethylhexyl methoxycinnamate | 20 | 20 | | |
| | | Second compound | Coumarin | | | 4 | 4 |
| | | Dissolution aid | Polyalkylene glycol | | 6 | | 6 |
| Evaluation results | Additive precipitation temperature [° C.] | | | −20 | −55 | −20 | −55 |

As shown in Table 4 above, in Example 9 and Example 11 in which polyalkylene glycol was mixed as a dissolution aid, the first compound and the second compound precipitated at low temperatures as compared to Example 8 and Example 10 in which polyalkylene glycol was not mixed as a dissolution aid.

It should be construed that the embodiments and examples disclosed herein are given by way of illustration in all respects, not by way of limitation. It is intended that the scope of the present disclosure is defined by claims, not by the description above, and encompasses all modifications and variations equivalent in meaning and scope to the claims.

REFERENCE SIGNS LIST 1 compressor; 2 flow path switching valve; 3 outdoor heat exchanger; 4 expansion valve; 5 indoor heat exchanger

The invention claimed is:

1. A refrigeration cycle apparatus comprising:
a refrigeration circuit, the refrigeration circuit including a compressor, an outdoor heat exchanger, an indoor heat exchanger, and an expansion valve, wherein
a refrigerant is sealed within the refrigeration circuit,
the refrigerant contains trifluoroiodomethane,
the compressor is filled with a refrigerator oil,
the refrigerator oil contains at least one of a first compound represented by the following chemical formula 1 and a second compound represented by the following chemical formula 2:

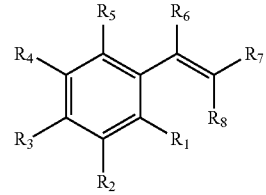

[Chemical Formula 1]

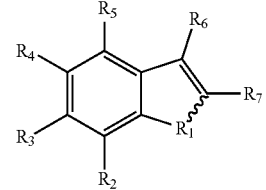

[Chemical Formula 2]

in the chemical formula 1,
each of $R_1$ to $R_5$ is a substituent composed of at least one of carbon atom, hydrogen atom, and oxygen atom, and at least one of $R_6$ to $R_8$ is a hydrogen atom with the remainder being a substituent composed of at least one of carbon atom, hydrogen atom, and oxygen atom, and in the chemical formula 2, $R_1$ is a substituent forming a ring structure with neighboring carbon atoms, the ring structure is a 5- to 8-membered carbon ring or heterocyclic ring, each of $R_2$ to $R_5$ is a substituent composed of at least one of carbon atom, hydrogen atom, and oxygen atom, and at least one of $R_6$ to $R_7$ is a hydrogen atom with the remainder being a substituent composed of at least one of carbon atom, hydrogen atom, and oxygen atom.

2. The refrigeration cycle apparatus according to claim 1, wherein a content of trifluoroiodomethane in the refrigerant is from 1 to 70 mass % relative to a total amount of the refrigerant.

3. The refrigeration cycle apparatus according to claim 1, wherein, in the chemical formula 1, $R_7$ is —COO—$R_{10}$, and $R_{10}$ is a hydrocarbon group having 1 to 10 carbon atoms.

4. The refrigeration cycle apparatus according to claim 1, wherein, in the chemical formula 1, $R_3$ is —O—$R_9$, and $R_9$ is a hydrocarbon group having 1 to 10 carbon atoms.

5. The refrigeration cycle apparatus according to claim 1, wherein, in the chemical formula 1, each of $R_1$ to $R_2$, $R_4$ to $R_6$, and $R_8$ is a hydrogen atom or a hydrocarbon group having 1 to 10 carbon atoms.

6. The refrigeration cycle apparatus according to claim 1, wherein, in the chemical formula 2, each of $R_2$ to $R_6$ is a hydrogen atom or a hydrocarbon group having 1 to 10 carbon atoms.

7. The refrigeration cycle apparatus according to claim 1, wherein the second compound is a compound represented by the following chemical formula 4

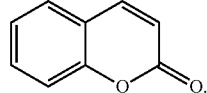

[Chemical Formula 4]

8. The refrigeration cycle apparatus according to claim 1, wherein the refrigerator oil contains a dissolution aid.

9. The refrigeration cycle apparatus according to claim 8, wherein the dissolution aid is polyalkylene glycol.

* * * * *